E. S. Hutchinson,
Extracting Oil.
No. 444,064. Patented Jan. 17, 1891.
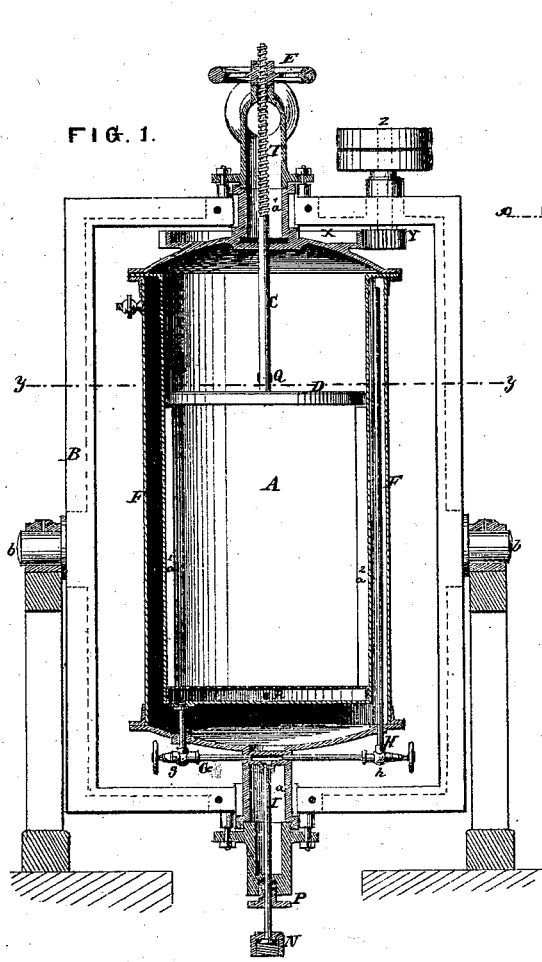
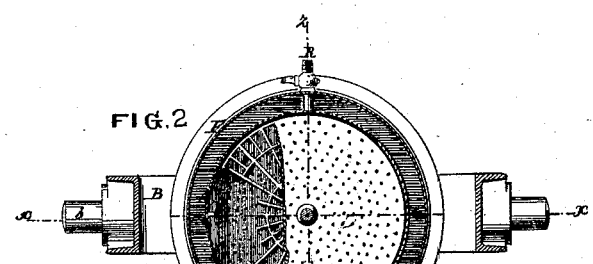
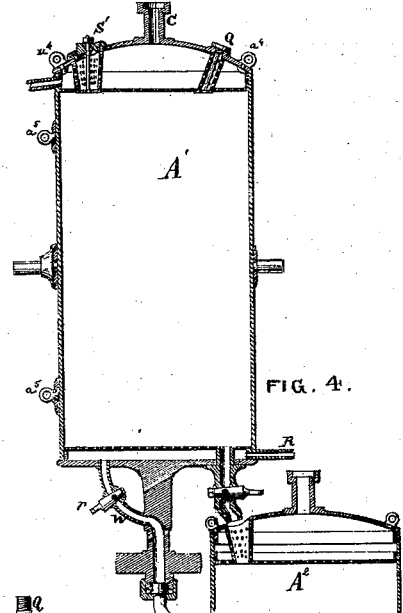
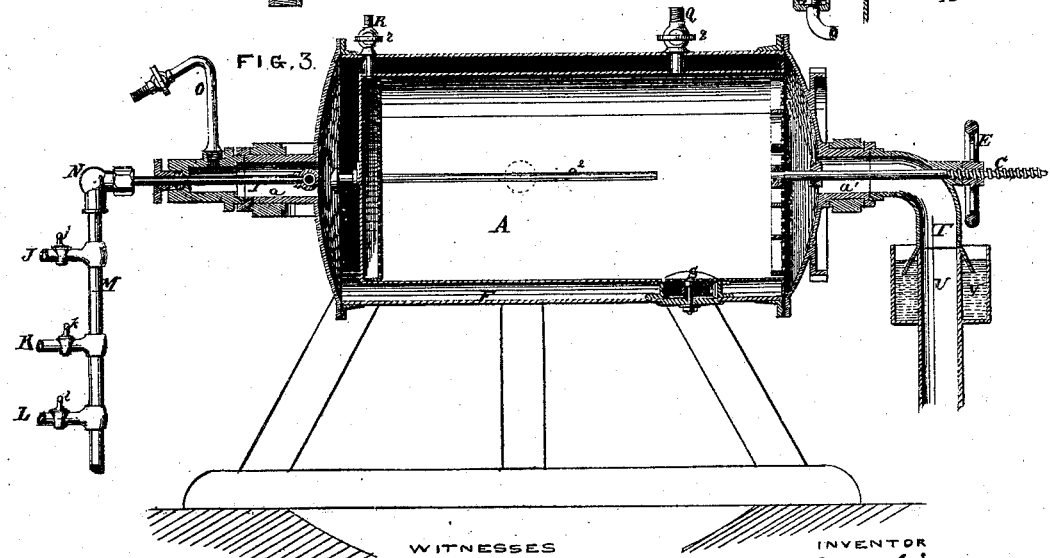
WITNESSES
Walter Allen
Wm H Brereton Jr
INVENTOR
E. S. Hutchinson
By Knight Bros attys

UNITED STATES PATENT OFFICE.

ELIAS S. HUTCHINSON, OF BALTIMORE, MARYLAND.

IMPROVEMENT IN APPARATUS FOR SEPARATING OIL FROM GRAIN AND OTHER MATERIALS.

Specification forming part of Letters Patent No. 111,064, dated January 17, 1871.

I, ELIAS S. HUTCHINSON, of Baltimore, in the State of Maryland, have invented a new and useful Process and Apparatus for Separating Oil from Grain and other Materials, of which invention the following is a specification:

Nature and Objects of the Invention.

My invention relates to the separation of oil from any material by a chemical agent.

In carrying my invention into effect I confine the meal within a suitable vessel or containing-chamber in such a manner that the chemical may be readily passed through the entire mass.

The chemical preferably employed is the liquid bisulphide of carbon, and when the separation of oil is complete the material treated is so far released as to permit the whole or a part of the mass to be agitated within the same vat or vessel, for the purpose of drying it. This release of the material may be effected either by enlarging the space or chamber within which it is confined or by drawing a portion of it off with the chemical into another vessel or chamber, from which the liquid is subsequently drained, and in which the material is dried. The remainder of the chemical, which will not flow or drip from the meal or other material treated, is finally driven off by a moderate application of heat and condensed for future use, the vat being at the same time subjected to a rotary or other motion to agitate the material, and thus expose all its parts to the drying action.

Various forms of apparatus may be employed in carrying out my invention. As a practical illustration, I shall describe one apparatus and a modification thereof.

Description of the Accompanying Drawing.

Figure 1 is a vertical section of an apparatus illustrating the invention, the vat being shown in the vertical position in which it is placed for treating the grain or other material to remove the oil. The line $x\,x$ in Fig. 1 shows the plane of section. Fig. 2 is a horizontal section of the same at $y\,y$, Fig. 2. Fig. 3 is a vertical section, showing the vat in the horizontal position in which it is placed for drying the meal or other material after the oil has been removed. The line $z\,z$ in Fig. 2 indicates the plane of section. Fig. 4 is a vertical section of an apparatus illustrating a way of carrying the invention into effect with a plurality of vessels or chambers without a movable diaphragm.

General Description.

In Figs. 1, 2, and 3, A represents an air-tight vat, supported by hollow journals $a\,a^1$ in a frame, B, so that the vat may be rotated within the said frame. The frame B is mounted by trunnions $b\,b$ in suitable stationary bearings. The vat is thus adapted to be turned at will on either one of two horizontal axes at right angles to each other. Within the vat A is a movable diaphragm, D, consisting of a cast frame-work covered with perforated sheet metal, and attached to a threaded rod, C, upon which is fitted a nut or threaded wheel, E, which is turned forward or backward to move the diaphragm up or down.

A water-jacket, F, surrounding the vat, may be employed for the alternate heating and cooling of its contents; but this jacket, when made to tilt and rotate with the vat, I do not claim as a part of my invention.

G H are branch pipes, supplied from a common central pipe, I, and provided with stop-cocks $g$ and $h$. The pipe G is to conduct either steam or air to the interior of the vat. The pipe H is to conduct either steam or water to the jacket F.

Pipes J K L respectively supply air, steam, and water from any convenient sources to the pipe M, which communicates with the pipe I through a coupling, N, when the apparatus is in the horizontal position shown in Fig. 3.

O is an overflow-pipe, through which is discharged surplus water which is forced through the jacket F to cool the apparatus. P is a stuffing-box, through which the pipe I passes. Q is a pipe for introducing sulphide of carbon or other chemical to remove the oil, and for draining off as much of the said chemical as will drop from the meal after the oil is removed. R is a discharge-pipe, through which the combined chemical and oil pass out to a separating apparatus, which is not here shown, but may be of any usual or convenient form. S is a cap covering a hand-hole employed for the introduction and removal of the meal or other material.

The hollow journal $a^1$ communicates with the interior of the vat and with a large pipe, T, which, when the vat is moved down into the horizontal position, as shown in Fig. 3, closes over the top of a pipe, U, employed to convey to a condenser the bisulphide, which is driven off from the meal in the form of vapor by a moderate application of heat. A water seal or trap, V, is employed to close the joint between the pipes T and U. X Y Z represent driving-gear, of common form, by which the vat may be rotated.

In the illustration given in Fig. 4 the movable diaphragm is dipensed with; but a stationary perforated diaphragm may be used in each end of the vat. The discharge-aperture S may, in this case, be located in the head of the vat $A^1$, and a separate aperture, S', of small size, may be used to introduce the meal. The pipe Q, through which the chemical is introduced, and the discharge-pipe R, for the chemical and the oil, are also located in the spaces between the perforated diaphragm and the respective heads of the vat. W is a draw-off pipe, made large enough to allow a portion of the meal to pass out with the bisulphide when the cock $r$ is opened. $A^2$ represents a second vat or chamber to receive the chemical and meal thus discharged. The vats $A^1$ and $A^2$ are each provided with two pairs of trunnions for rotating and tipping them, for which purposes they are set in stationary bearings. They are provided with eyes or staples, as shown at $a^4$ and $a^5$, for the purpose of lifting them in either their horizontal or vertical position by means of a crane. C represents a pipe for introducing steam or air, as required. $a^1$ are ribs on the inside of the vat A to aid in agitating the material as the vat rotates.

Operation.

In the case of the apparatus shown in Figs. 1 and 2, the vat having been about two-thirds filled and turned into a vertical position, the perforated diaphragm D is screwed down until it comes in contact with the surface of the meal or other material. The liquid bisulphide of carbon is then introduced through the pipe Q, and, permeating the entire mass of meal, mingles with the oil therein, and, rising through the diaphragm D, overflows through the pipe R, carrying the oil with it, until the chemical comes over without oil, thus indicating that this part of the operation is completed. The influx of the chemical is then stopped, the cock $g$ closed, and as much of the chemical as possible is drained out of the meal. The diaphragm D is then elevated, and the vat turned down in the trunnions $b\ b$ to its horizontal position and rotated within the frame B, so as to agitate the meal. The pipe I having been coupled to the pipe M, steam is then introduced to heat the water in the jacket F, and the heat and agitation together quickly vaporize all the remaining chemical, which is conducted through the pipe T to a condenser, and retained in liquid form for further use. The cock $g$ is then opened, admitting a dash of steam into the space above the meal, so as to eject all the hydrocarbon vapor, and the steam-pipe is immediately reclosed. A current of cold water is next passed through the jacket to cool the apparatus and its contents, the said water overflowing through the pipe O. The cocks $j$ and $g$ being then opened, a current of air is driven through the vat while the meal is still agitated, so as to completely ventilate it and remove any smell of the vapor. This done, the cap S is removed, the meal discharged, and a new charge introduced.

With the other form of the apparatus illustrated in Fig. 4 the same process is carried out in an analogous way. A large number of the vats $A^1$ and $A^2$ may be employed, with suitable stationary frames for them to rest in, in either a vertical or horizontal position, a single crane being employed to handle them. By this crane the vat $A^1$ is taken in a vertical position and deposited in bearings at a convenient place, where it is charged with meal. The chemical is then passed through it until the oil is removed, after which the vat is carried to the secondary vat, $A^2$, and, the cock being opened, the bulk of the chemical will immediately flow out freely, carrying with it a portion of the meal. The vat $A^1$ is turned horizontally, and lifted in that position to a water-bath, in which it is immersed, and supported by its axial trunnions in vertical bearings.

The rotation of the vat after its partial depletion, as before explained, agitates the meal until it is dry, when a dash of steam is introduced, as before, and the vat removed to a cold bath, where the cooling and ventilating operations are performed.

One of the stationary vats, $A^2$, may serve for use with four or more of the vats $A^1$, because the meal is not "treated" in the said secondary vats, and the quantity discharged into them from each of the vats $A^1$ is less than what remains in the latter.

After the meal has been left to drain for a short time in the vat $A^2$, the drying, cooling, and ventilating operations are performed, by the aid of the crane and the hot and cold water baths, in the same manner as with the vat $A^1$.

Claims.

I claim as my invention—

1. An apparatus for separating oil from vegetable and other matters, adapted to confine the material while the oil is removed, and afterward release and agitate it for drying, either wholly within the same chamber or by discharging a portion into another chamber or chambers.

2. A vat for removing oil from vegetable and other matters, adapted to be turned or tipped on two axes, substantially as and for the purposes set forth.

ELIAS S. HUTCHINSON.

Witnesses:
 OCTAVIUS KNIGHT,
 WALTER ALLEN.